May 3, 1927. J. F. MOODY ET AL Re. 16,613
SAFETY HOOK
Original Filed June 24. 1924
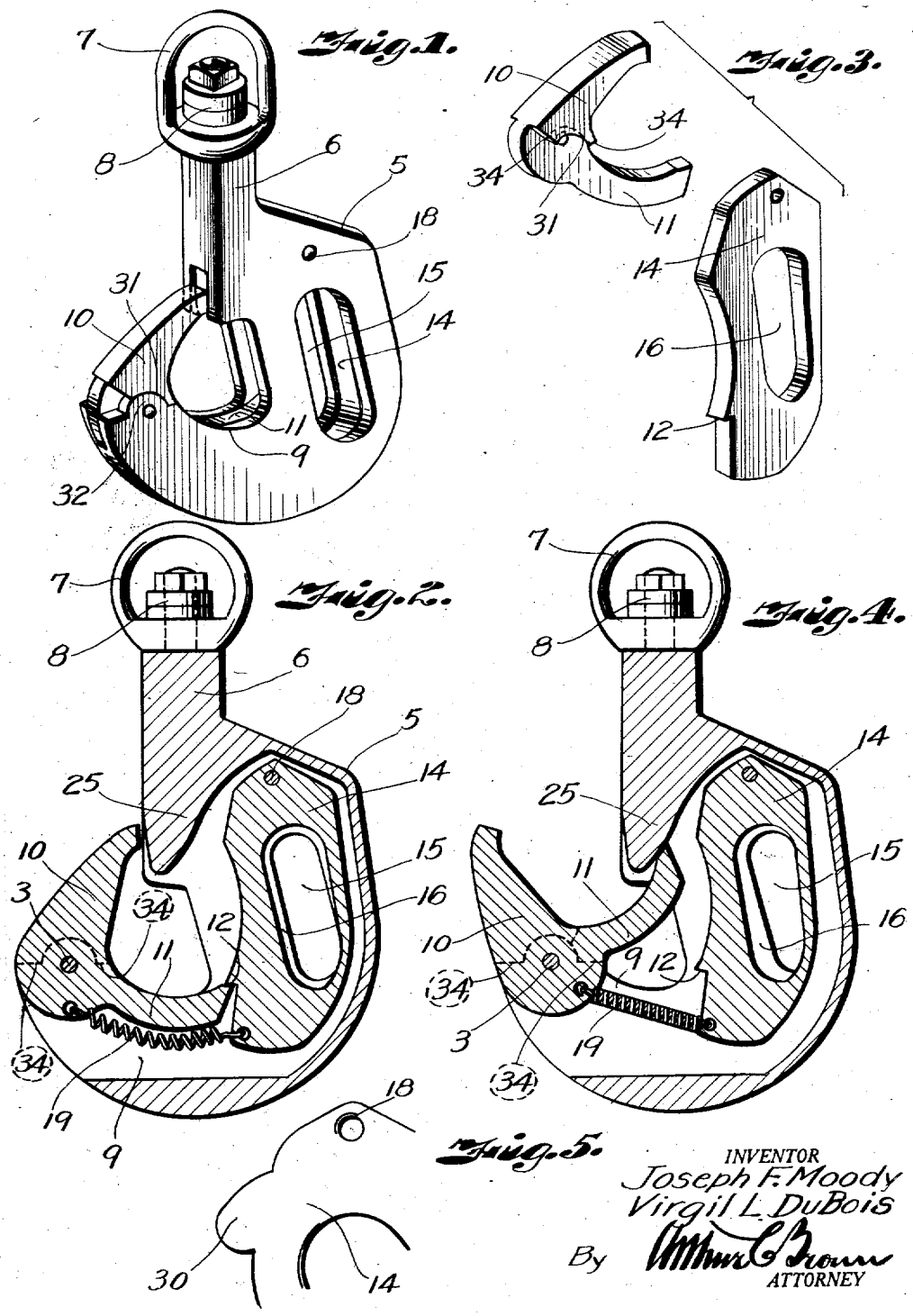
INVENTOR
Joseph F. Moody
Virgil L. DuBois
By Arthur C. Brown
ATTORNEY Reissued May 3, 1927. Re. 16,613

UNITED STATES PATENT OFFICE.

JOSEPH F. MOODY AND VIRGIL L. DU BOIS, OF TULSA, OKLAHOMA, ASSIGNORS, BY DIRECT AND MESNE ASSIGNMENTS, TO ALBERT H. NEILSON, OF TULSA, OKLAHOMA.

SAFETY HOOK.

Original No. 1,541,991, dated June 16, 1925, Serial No. 722,071, filed June 24, 1924. Application for reissue filed November 6, 1926. Serial No. 146,834.

This invention relates to safety hooks especially adapted for use in connection with the bails of elevators, and the like.

Briefly stated, an important object of this invention is to provide a safety hook having simple means whereby the same may be positively closed to hold the bails of an elevator, or the like, in engagement with the hook.

A further object of the invention is to provide a hook having simple means whereby the hand of the operator may be directly engaged therewith in such a manner that the hand is well protected and in such a manner that the locking member may be conveniently operated.

A further object is to provide a safety hook which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a perspective of the improved hook;

Fig. 2 is a vertical sectional view through the same in its closed position;

Fig. 3 is a group perspective illustrating a closing or locking bar and a trigger for holding the same in an operative position;

Fig. 4 is a vertical sectional view through the improved hook in its open position;

Fig. 5 is a detail elevation illustrating a slightly modified form of trigger.

In the drawing, the numeral 5 designates a body having a shank 6 to which an attaching member 7 is swiveled by a ball bearing connection 8. Figs. 1 and 2 illustrate that the lower portion of the hook is provided with a pair of curved bills 9 co-operating with the forward portion of the body in defining a socket for the reception of the bails or a bail of an elevator or the like.

A latch 10 is pivoted as indicated at 3 between the spaced bills 9 and is adapted to extend over and close the socket in the hook so as to positively prevent the bail or bails of an elevator or the like from being accidentally disconnected from the hook.

Figs. 2 and 3 illustrate that the latch 10 is provided with an inwardly extending branch 11 adapted to be engaged by a shoulder 12 on the lower portion of a hand operated trigger 14. The major portion of the body 5 is hollowed out for the reception of the trigger 14 and is provided with alined hand holes 15 by means of which the hand of the operator may be extended through the body and through a hand hole 16 in the latch. It is thus seen that the hand of the operator may be conveniently engaged with the hook and with the trigger 14 for either guiding the hook into engagement with the bails of an elevator or for disengaging the shoulder 12 of the trigger from the branch 11.

The trigger 14 is pivotally mounted at its upper end as indicated at 18 and the lower portion of the trigger is connected by a coil spring 19 with the lower portion of the latch. As soon as the latch is released by the backward movement of the trigger 14 the coil spring 19 will urge the latch 10 to the position illustrated in Fig. 4 so as to move the bail out of the socket in the hook. A further and equally important purpose of the spring 19 is to hold the trigger in engagement with the branch 11 while the bail is within the socket of the hook.

In operation, the hand of the operator is extended through the openings 15 and 16 and the hook is guided into engagement with the bail or bails to be engaged. As the bail enters the socket it engages the branch 11 and forces it downwardly to the position illustrated in Fig. 2 whereupon the shoulder 12 is hooked over the branch 11 so as to hold the latch in the position illustrated in Figs. 1 and 2. The bail is now securely held in the socket of the hook and is not easily disengaged as a result of the hook striking various objects, such as portions of the derrick. It is important to note that the branch 11 extends into the hollowed portion of the hook and a depending stop member 25 is carried by the upper portion of the hook and is arranged in the path of travel of the branch 11 so as to limit the outward swinging movement of the same. This positions the latch 10 in an outwardly inclined position for properly engaging the bail of an elevator. This also forms a gradually restricted entrance opening for the bail so that the bail may be conveniently engaged. Also, it will be seen that the inward movement of the latch 10 is limited by contact with the depending stop 25.

In carrying out the invention, the latch-controlling trigger 14 may be provided with a lug or shoulder 30 arranged in the path of travel of the latch 11 so as to limit the outward swinging movement of the same, this feature of the invention being illustrated in Fig. 5.

The invention forming the subject matter of this application is especially adapted for use in pulling sucker rods and tubing from oil wells and for hooking buckets from lead and zinc mines or in fact in any other place where a hook of this character would be found desirable.

The safety feature of the hook does not in any way interfere with the freedom of use of the hook or involve any departure from established practices.

Fig. 1 plainly illustrates that the latch 10 has its lower portion laterally enlarged to provide arcuate shoulders 31 which ride over the rounded ears 32 at the ends of the bills 9 so that the strain on the pivot point 11 is removed. The lower end of the latch may also be provided with shoulders 34 which engage the ends of the bills at opposite sides of the ears 32 to limit the swinging movement of the latches.

From the foregoing it is apparent that when a bail is located in the hook and the latch and trigger are in their functional positions, the bail cannot be accidentally displaced. Should the hook be swung into contact with the derrick or be struck by an object, jar of the bail against the latch would be resisted by the detent and contact of the latch by or with an object would be resisted by the hook body.

It is further apparent that the spring urges the trigger to position for engaging the latch and that the trigger serves as an actuator for the latch after the latch has been released from the detent.

Having thus described the invention, what is claimed is:

1. In a safety hook, body and hook members, forming a bail socket, a latch movable relative to the socket to close the socket, a handle pivoted to the hook body and having a shoulder for detaining the latch, and connection between the handle and latch for operating the latch following its release from the shoulder, the shoulder and said connection being at the same side of the handle pivot.

2. In a safety hook, body and hook members, forming a bail socket, a latch movable relative to the socket to close the socket, a handle having one end pivoted to the hook body and having a shoulder at its other end for detaining the latch, and means at said other end of the handle connecting the handle and latch for operating the latch following its release from the shoulder and by continued movement of the handle in the direction of movement for releasing the latch.

3. In a safety hook, body and hook members, forming a bail socket, a latch movable relative to the socket to form a keeper, a trigger member comprising a detent shoulder for the latch, the latch when in functional position being engageable with the body member to limit its movement in one direction and with the detent shoulder to limit its movement in the other direction, the trigger having actuating connection with the latch.

4. In a safety hook, a body member having a bill, forming a bail socket, a latch movable relative to the socket to form a keeper, a trigger member comprising a detent shoulder for the latch, the latch engageable with the body to limit its movement in one direction and with the detent shoulder to limit its movement in the other direction, and a coil spring constituting a pull connection between the trigger and latch urging the trigger member to position for detaining the latch and initiating movement of the latch to open the socket.

5. A safety hook comprising a body having a pair of bills cooperating with the body in defining a socket, a latch pivoted to the bills and having an inwardly extending branch, and a trigger adapted to engage the branch to hold the same in position, said trigger being housed within and protected by said body.

6. A safety hook comprising a body having a pair of bills cooperating with the body in defining a socket, a latch pivoted to the bills and having an inwardly extending branch, a trigger adapted to engage the branch to hold the same in position and a spring connecting the lower portion of the latch and the lower portion of the trigger to urge the trigger into engagement with the branch and to urge the latch to its outermost position, said trigger being housed within and protected by said body.

7. A safety hook comprising a body having spaced bills, a latch pivoted to the bills and having a branch arranged between the bills, and a trigger pivotally carried within the body and adapted to engage said branch to hold the latch in an operative position, said trigger being housed within and protected by said body.

8. A safety hook comprising a body having spaced bills, a latch pivoted to the bills and having a branch arranged between the bills, a trigger pivotally carried within the body and adapted to engage said branch to hold the latch in an operative position, and a spring arranged between said bills and being connected to the lower portion of said trigger and lower portion of said latch to urge the trigger into engagement with said branch and to urge the latch to its outermost position, said trigger being housed within and protected by said body.

9. A safety hook comprising a body having spaced bills, a latch pivoted to the bills and having a branch arranged between the bills, a trigger pivotally carried within the body and adapted to engage said branch to hold the latch in an operative position, and a spring arranged between said bills and being connected to the lower portion of said trigger and lower portion of said latch to urge the trigger into engagement with said branch and to urge the latch to its outermost position, said body and said trigger being provided with hand holes, said trigger being housed within and protected by said body.

10. A safety hook comprising a body having spaced bills, a latch pivoted to the bills and having a branch arranged between the bills, a trigger pivotally carried within the body and adapted to engage said branch to hold the latch in an operative position, a spring arranged between said bills and being connected to the lower portion of said trigger and lower portion of said latch to urge the trigger into engagement with said branch and to urge the latch to its outermost position, said body and said trigger being provided with hand holes, and said body being provided with a depending lug arranged in the path of travel of said latch and the branch of the same to limit the movement of the latch in one direction and to limit the movement of the branch in the other direction, said trigger being housed within and protected by said body.

11. A safety hook comprising a body having its major portion hollowed and provided with a pair of bills, the end portions of which are provided with ears, a latch pivoted between said bills and having a branch arranged between the bills, a trigger pivoted at its upper portion within said hollowed body and having its lower portion provided with a shoulder adapted to engage said branch to hold the latch in a set position, and a coil spring connected to said latch below the pivot point of the same and to the lower portion of said trigger to urge the trigger into engagement with said branch and to urge the latch outwardly upon being released, said trigger being housed within and protected by said body.

12. A safety hook comprising a body having its major portion hollowed and provided with a pair of bills, the end portions of which are provided with ears, a latch pivoted between said bills and having a branch arranged between the bills, a trigger pivoted at its upper portion within said hollowed body and having its lower portion provided with a shoulder adapted to engage said branch to hold the latch in a set position, and a coil spring connected to said latch below the pivot point of the same and to the lower portion of said trigger to urge the trigger into engagement with said branch and to urge the latch outwardly upon being released, said latch provided with oppositely arranged shoulders riding over and engaging said ears, said trigger being housed within and protected by said body.

In testimony whereof we affix our signatures.

JOSEPH F. MOODY.
VIRGIL L. DU BOIS.